(12) United States Patent
Hiller et al.

(10) Patent No.: US 6,445,922 B1
(45) Date of Patent: Sep. 3, 2002

(54) METHOD AND SYSTEM FOR SUPPORT OF OVERLAPPING IP ADDRESSES BETWEEN AN INTERWORKING FUNCTION AND A MOBILE IP FOREIGN AGENT

(75) Inventors: Thomas Lloyd Hiller, Glen Ellyn; Jin Wang, Lisle, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/461,881

(22) Filed: Dec. 15, 1999

(51) Int. Cl.$^7$ ................................................ H04Q 7/20
(52) U.S. Cl. ........................ 455/433; 370/401; 709/238
(58) Field of Search .......................... 455/433; 370/328, 370/338, 349, 401–409; 709/238

(56) References Cited

U.S. PATENT DOCUMENTS

| | | | | |
|---|---|---|---|---|
| 6,137,791 A | * | 10/2000 | Frid et al. .................... | 370/352 |
| 6,161,008 A | * | 12/2000 | Lee et al. .................... | 455/414 |
| 6,172,986 B1 | * | 1/2001 | Wataniki et al. ............ | 370/466 |
| 6,195,705 B1 | * | 2/2001 | Leung ......................... | 709/245 |
| 6,308,267 B1 | * | 10/2001 | Gremmelmaier ............ | 713/168 |
| 6,377,982 B1 | * | 4/2002 | Rai et al. .................... | 709/217 |

OTHER PUBLICATIONS

McCann et al., Transparent Hierarchical Mobility Agents, Mar. 1999, pp. 1–14.
Perkins et al., Private Addresses in Mobile IP draft–ietf–mobileip–privaddr–00.txt, Jun.25, 1999, 10 Pages.
$3^{rd}$ Generation Partnership Project 2 (3GPP2), Wireless IP Network Standard, Dec. 10, 1999, pp. 1–50.

* cited by examiner

*Primary Examiner*—Daniel Hunter
*Assistant Examiner*—Tuan Tran
(74) *Attorney, Agent, or Firm*—Walter W. Duft

(57) ABSTRACT

A method and system are disclosed for supporting overlapping IP addresses by sharing a mobile node identifier between an IWF and a Foreign Agent in a visited data (e.g., wireless) network. The mobile node identifier is stored in lookup tables associated with the IWF (Mobile Identity table) and the Foreign Agent (Visitor List table). When a data packet travels between the IWF and the Foreign Agent, the mobile node identifier is attached to it. For data packets moving in the reverse Mobile IP traffic direction (from the mobile node), the Foreign Agent uses the mobile node identifier to identify the correct Home Agent destination by finding the corresponding Home Agent address in the Visitor List table. For forward Mobile IP traffic (to the mobile node), the IWF uses the mobile node identifier to identify the correct mobile node destination by finding the corresponding link identifier in the Mobile Identity table.

31 Claims, 6 Drawing Sheets

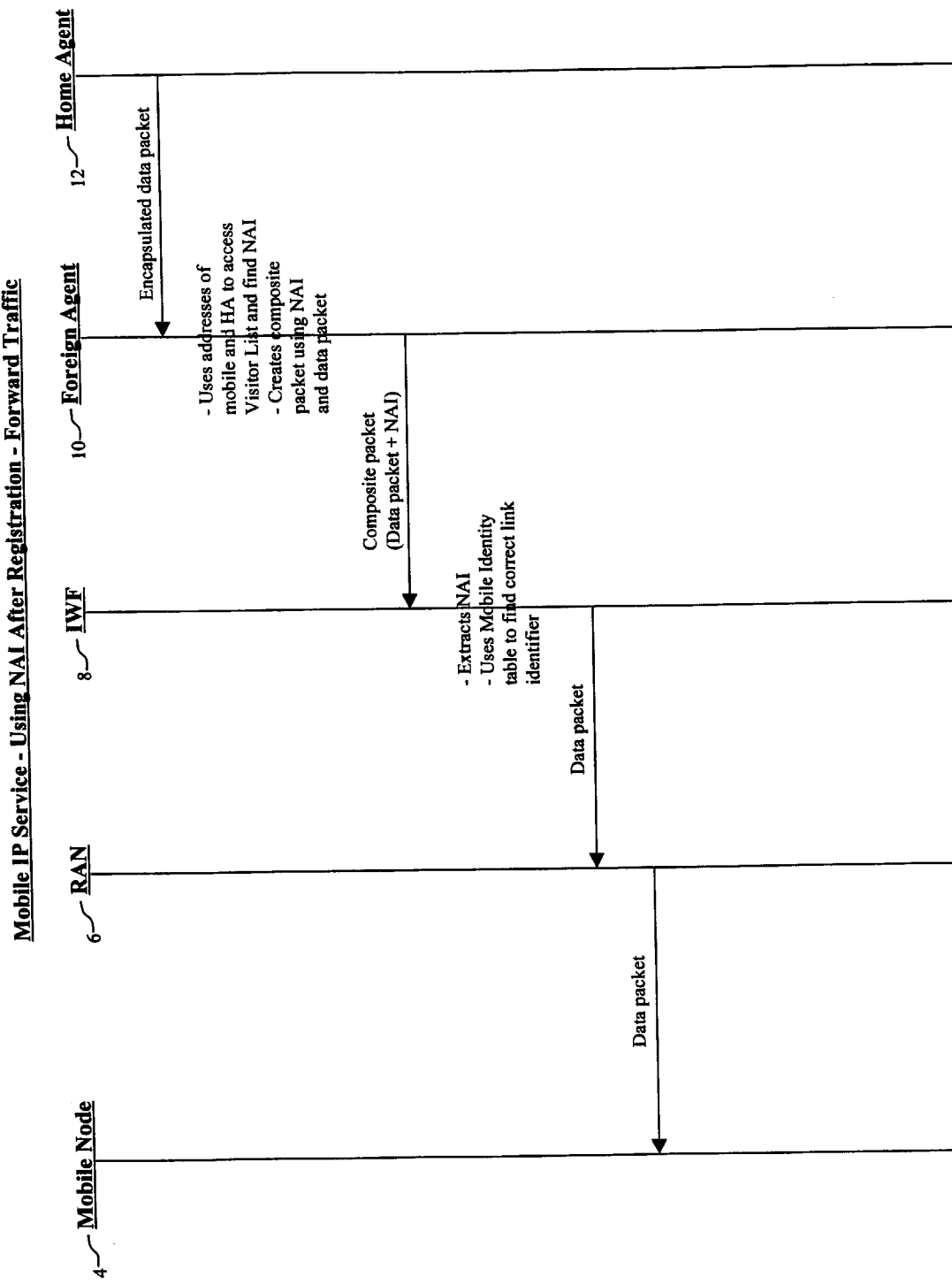

METHOD AND SYSTEM FOR SUPPORT OF OVERLAPPING IP ADDRESSES BETWEEN AN INTERWORKING FUNCTION AND A MOBILE IP FOREIGN AGENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the routing of data packets to and from a mobile node in a visited wireless data network when the mobile node's home address matches the home address of another mobile node in the same visited network.

2. Description of the Prior Art

In a wireless data network implemented according to a mobile networking standard, such as the Mobile Internet Protocol (IP) specifications (RFC2002) promulgated by the Internet Engineering Task Force (ETF), a mobile node is able to change its point of attachment to a data network, such as the Internet, and communicate with other data network nodes at any location without changing its home (IP) address. While communicating with other network nodes, the mobile node communicates across an air interface to a base station, and typically sends and receives data packets over a Point-to-Point Protocol (PPP) link that connects the mobile node to a centralized network element known as an Interworking Function (IWF) that hides cellular specific aspects from the general IP network. According to the IETF Mobile IP specifications, the IWF is further linked to send packets to or receive packets from a Foreign Agent, which is a router located in the mobile node's visited network. When sending packets to the Foreign Agent, the IWF removes the PPP header; when receiving packets from the Foreign Agent, the IWF adds the PPP header. The Foreign Agent and a Home Agent (a router located in the mobile node's home network) exchange data packets between each other via a tunnel. A tunnel is a path followed by the user's data packet while it is encapsulated in another packet.

Although existing Mobile IP standards can manage data transmissions between mobile nodes that attach to the public Internet, they do not provide specifications for IWF/Foreign Agent handling of communications between mobile nodes that attach to private networks. This limitation is significant because users of wireless data services desire the ability to access their private networks to allow them to perform various tasks such as viewing intranet web pages and reading and dispatching email.

The private network limitation inherent in existing Mobile IP standards specifically relates to the lack of specifications for handling potentially overlapping home addresses of mobile nodes. A private home address may overlap with an identical address from a different private network because, unlike addresses on the public Internet, private addresses are not globally administered through a registration system. Rather, they are selected by private network administrators from the IP address pools reserved for private networks.

Under current Mobile IP standards, the problem with overlapping home addresses arises when two mobile nodes, each associated with a separate private network, are to be served by the same visited wireless network/IWF and the same Foreign Agent. In this case, the Foreign Agent cannot distinguish between two such nodes with identical home addresses when transmitting data packets in the reverse traffic direction (i.e., from the mobile nodes to their corresponding Home Agents). The Foreign Agent is unable to ascertain the difference between the two mobile nodes because it relies on the mobile node's home address to determine the Home Agent to which the data packets should be sent -or tunneled. When the two mobile nodes have the same home address, the Foreign Agent cannot perform its normal reverse direction routing functions.

In the forward traffic direction (i.e., from the Foreign Agent to the mobile node), a similar problem arises because the IWF does not have enough information to transmit the data packets to the correct mobile nodes. To correctly transmit the data packets, the IWF needs, but lacks, the critical information specifying which Home Agent sent the data packet to the Foreign Agent.

Accordingly, there is a need in a wireless data network for a method and system that support the correct transmission of data packets to and from a roaming mobile node when that node has an IP address that matches the IP address of another mobile node linked to the same visited network. More particularly, a method and system are needed for distinguishing between mobile nodes with overlapping IP addresses during the transmission of data packets to and from an Interworking Function and a Mobile IP Foreign Agent. cl SUMMARY OF THE INVENTION A system and method in accordance with the invention support the correct routing of data packets to and from mobile nodes that are connected to the same visited data network and have overlapping home (IP) addresses. Preferably through associated storage tables, an IWF and a Foreign Agent in a visited data network retrieve and share a mobile node identifier that can differentiate between mobile nodes with identical home addresses.

In preferred embodiments of the invention, the mobile node identifier that can uniquely identify a mobile node is a Network Address Identifier (NAI) that is stored in a Mobile Identity table associated with the IWF and in a Visitor List table associated with the Foreign Agent. As a data packet travels across the visited data network in the reverse traffic direction, a composite packet is formed from the data packet and the NAI at the IWF and sent to the Foreign Agent. The Foreign Agent extracts the NAI and uses it with the Visitor List table to look up a Home Agent that corresponds to the mobile node. Once the mobile node's Home Agent is determined, the Foreign Agent sends the data packet to that Home Agent. When a data packet moves in the forward traffic direction, a similar composite packet is formed by the Foreign Agent and sent to the IWF. The IWF extracts the NAI and uses it to find the mobile node's link identifier in the Mobile Identity table. Once the link identifier is known, the IWF sends the data packet to the correct mobile node.

BRIEF DESCRIPTION OF THE DRAWING

The foregoing and other features and advantages of the invention will be apparent from the following more particular description of a preferred embodiment of the invention, as illustrated in the accompanying Drawing, in which:

FIG. 5 is a ladder diagram showing method steps performed in accordance with the invention to implement the portion of the wireless data network scheme of FIG. 2 that corresponds to the transmittal of a data packet from a Home Agent to its corresponding mobile node.

DETAILED DESCRIPTION OF THE PREFERRED EMBODIMENT

Figure 1:
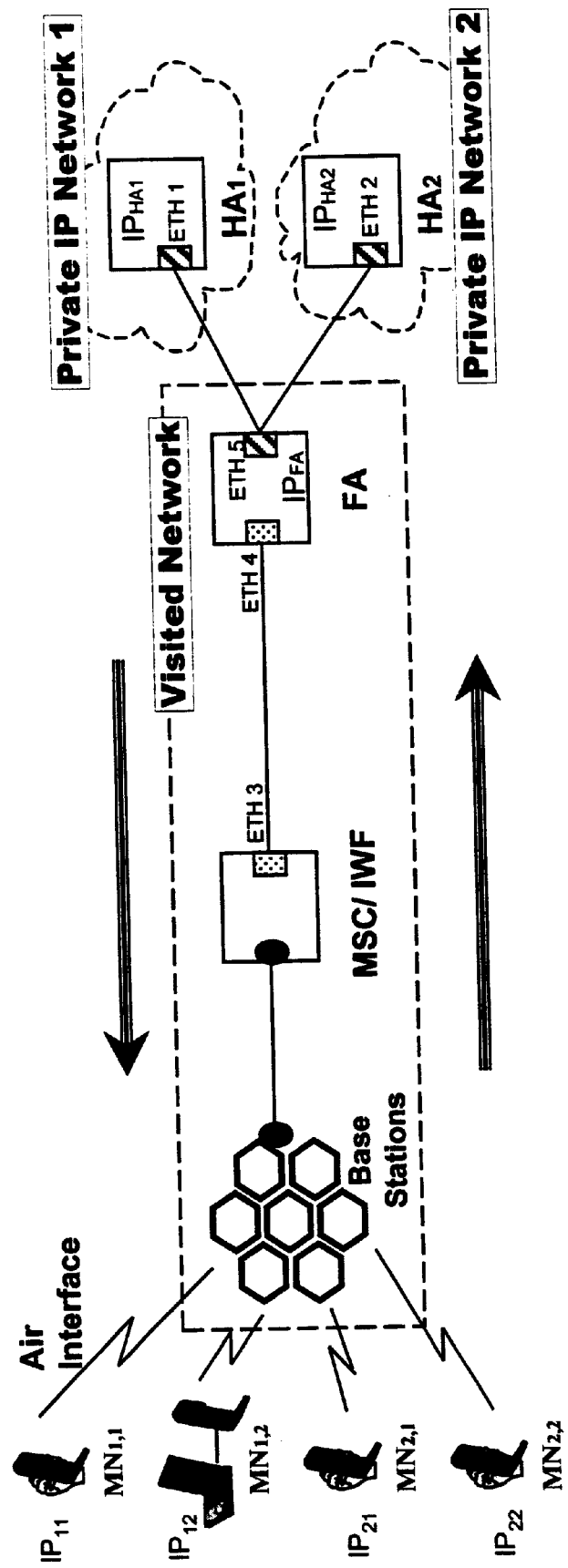
FIG. 1 is a block diagram showing a prior art scheme for transmitting data packets to and from mobile nodes in a wireless data network.

Turning now to the figures, wherein like reference numerals represent like elements in all of the several views, FIG. 1 illustrates, by way of additional background, the prior art wireless data network scheme described above wherein data packets are transmitted between mobile nodes and their corresponding Home Agents. More particularly, in the wireless data network scheme shown in FIG. 1, a mobile node ($MN_{1,1}$, $MN_{1,2}$, $MN_{2,1}$, or $MN_{2,2}$) can be a separate mobile device, such as a mobile phone, which is equipped with radio equipment (e.g., $MN_{1,1}$, $MN_{2,1}$, and $MN_{2,2}$), or a mobile device connected to another computing device, such as a laptop or notebook computer (e.g., $MN_{1,2}$). Mobile nodes $MN_{1,1}$ and $MN_{1,2}$ are associated with a private IP network 1 offering Mobile IP service with a Home Agent $HA_1$ that communicates with a public portion of the data network via an Ethernet card ETH 1 that is assigned a public IP address. Similarly, mobile nodes $MN_{2,1}$ and $MN_{2,2}$ are associated with a private IP network 2. The IP network 2 has its own Home Agent ($HA_2$) that communicates with the public portion of the data network via an Ethernet card ETH 2 that is also assigned a public IP address. Furthermore, mobile nodes $MN_{1,1}$, $MN_{1,2}$, $MN_{2,1}$, and $MN_{2,2}$ have home (IP) addresses $IP_{11}$, $IP_{12}$, $IP_{21}$, and $IP_{22}$, respectively.

The home addresses $IP_{11}$ and $IP_{12}$ must be different because they are associated with the same private network. Similarly, $IP_{21}$ and $IP_{22}$ must be different addresses. It is possible, however, that one of the home addresses in the first private network (e.g., $IP_{12}$) is identical to one of the home addresses in the second private network (e.g., $IP_{21}$).

As shown in FIG. 1, when a mobile node is away from its associated private IP (home) network, the network that serves the node is called the visited network. A data packet transmitted in the reverse traffic direction travels from a mobile node $MN_{1,1}$, $MN_{1,2}$, $MN_{2,1}$, or $MN_{2,2}$) over an air interface to an associated Mobile Base Station. From the Base Station the packet is routed over a T1/E1 or ATM trunk group to a Mobile Switching Center (MSC) and Interworking Function (IWF). From the IWF, the packet is transmitted to a Foreign Agent (FA). Interconnected Ethernet cards ETH 3 and ETH 4 having private IP addresses are respectively located in the IWF and FA to provide this communication path. Finally, the FA transmits the packet to the Home Agent ($HA_1$ or $HA_2$) corresponding to the mobile node from which the packet originated. An Ethernet card ETH 5 having a public IP address is located in the FA to provide this communication path. Continuing the example where home addresses are identical (e.g., $IP_{12}$ matches $IP_{21}$), a routing problem arises when the data packet originates from a mobile node corresponding to one of those identical home addresses (e.g., $M_{1,2}$ or $MN_{2,1}$). In this case, the FA cannot reliably route the data packet to the correct Home Agent ($HA_1$) because the FA does not have a unique home address for the mobile node and requires more distinguishing or unique information to determine the corresponding Home Agent.

As shown in FIG. 1, a data packet dispatched in the forward traffic direction travels from one of the Home Agents ($HA_1$ or $HA_2$) to the FA. From the FA, the packet is transmitted to the MSC and IWF. From the IWF, the packet travels via one of the Base Stations to the mobile node that is associated with the Home Agent from which the packet originated. In the example above where home address $IP_{12}$ is identical to $IP_{21}$, the IWF needs to know which Home Agent sent the packet. Because the IWF does not have this information, it is unable to transmit the packet to the right mobile node.

Figure 2:
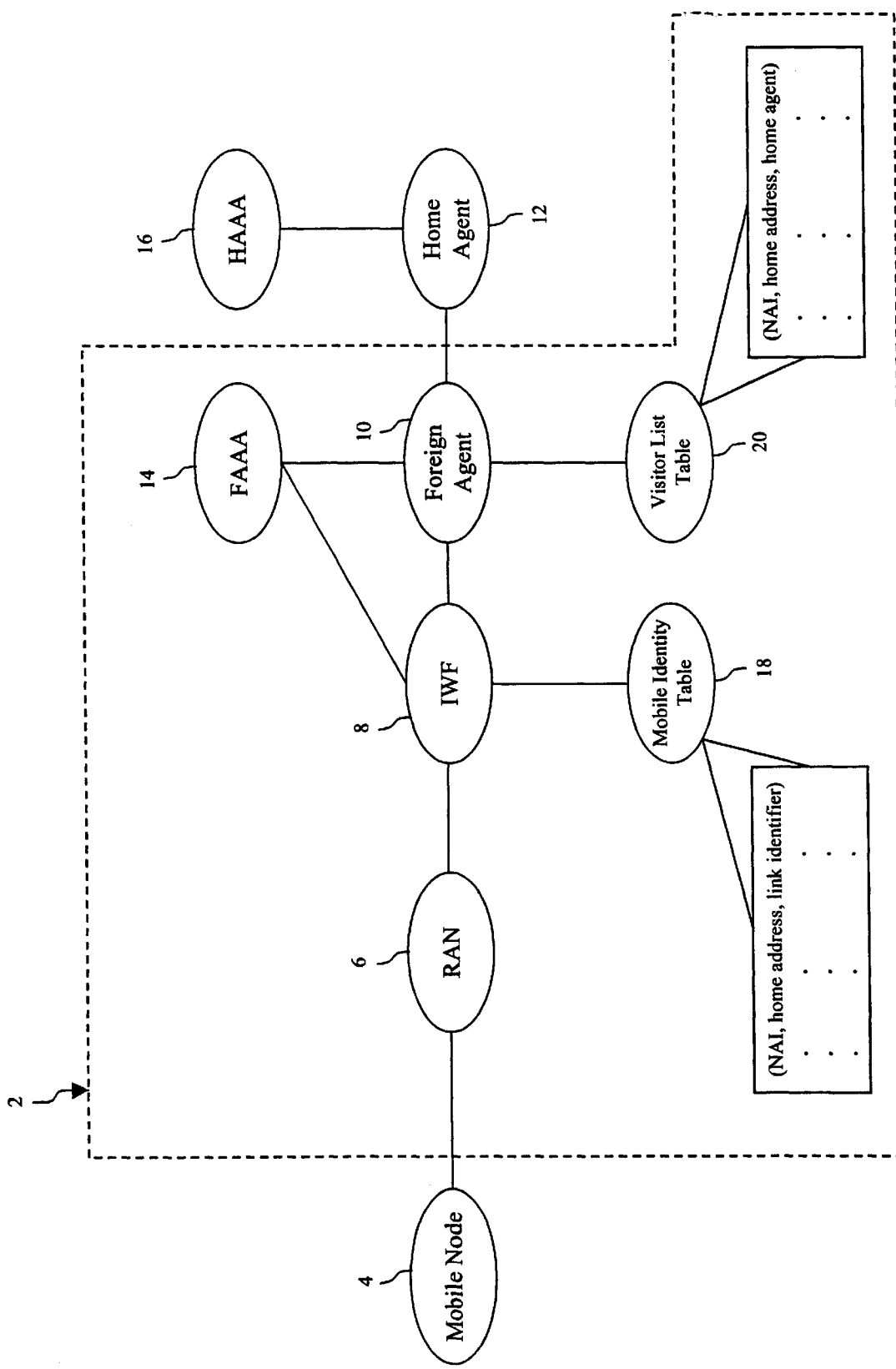
FIG. 2 is a block diagram showing a visited wireless data network system for transmitting data packets between a mobile node in the visited wireless data network and the mobile node's home data network in accordance with a preferred embodiment of the invention.

Turning now to FIG. 2, the communication pathway in a visited wireless IP data network 2 is shown in accordance with a preferred embodiment of the invention. In the visited data network 2, data packets can travel in the reverse and forward traffic directions. A data packet traveling in the reverse traffic direction starts at a mobile node 4, which includes a mobile radio terminal and user equipment, such as a cellular telephone, a laptop computer, etc. The mobile node 4 may include a radio-equipped mobile device connected to a computing device, such as a laptop computer, which has no built-in radio equipment (e.g., $MN_{1,2}$ in FIG. 1). The mobile node 4 can change its point of attachment from one visited data network to another and supports cellular access, Mobile IP, and the user's applications. Data packets (which may include voice, multimedia or other real-time information) traveling in the reverse traffic direction are transmitted from the mobile node 4 via a Radio Access Network (RAN) 6, which supports the mobile node 4's radio access to the IWF 8 and Foreign Agent 10. From the RAN 6, data packets travel to the IWF 8, a centralized network element that supports, by way of example, a PPP data link protocol that runs between the mobile node 4 and the IWF 8 according to the IETF's RFC1661 standard. From the IWF 8, data packets are sent to the Foreign Agent 10, which is a routing entity in the visited data network 2 being visited by the mobile node 4. Finally, data packets are transmitted from the Foreign Agent 10 to a Home Agent 12. The Home Agent 12 is a routing entity located on the mobile node 4's home data network. Data packets can also start at the Home Agent 12 and travel in the forward traffic direction. When traveling in the forward direction, data packets are sent from the Home Agent 12 to the Foreign Agent 10, the IWF 8, the RAN 6, and finally to the mobile node 4.

To distinguish between mobile nodes that have identical home addresses while they are visiting the same network, a mobile node identifier is used for communication between the IWF 8 and the Foreign Agent 10. In the preferred embodiment of the invention described herein, a Network Address Identifier (NAI) that uniquely identifies a mobile node 4 is attached to each data packet transmitted in the visited data network 2. The NAI is an identifier of the form user@realm and is associated with the mobile node user's IP (home) address, assuming the user has been assigned such an address. When a mobile node 4 consists of a radio-equipped mobile phone or device connected to another computing device that has no built-in radio equipment (e.g., $MN_{1,2}$ in FIG. 1), the node may have (i) more than one NAI (e.g., one NAI for a user's intranet and another for public Internet access) and may request two (or more) home (IP) addresses for use over a shared PPP connection, where one home address is from one domain (associated with one NAI), and another home address is from another domain (associated with the other NAI); or (ii) one NAI and request two (or more) home addresses for use over a shared PPP connection, where the home addresses are different.

The method of acquiring the NAI varies depending on the type of Mobile IP service implemented by the visited data network 2. Under a first service, which may be referred to as Basic Mobile IP, and which complies with IETF RFC2002, the IWF 8 acquires the NAI during a PPP authentication phase wherein the user of the mobile node 4 is verified by a Home Authentication, Authorization, and Accounting server (HAAA) 16. To perform the verification procedure, the mobile node 4 generates a hash containing the user's NAI and the IWF 8 sends the hash together with the NAI to the HAAA 16 via a Foreign AAA server (FAAA) 14. A second service, which may be referred to as Enhanced Mobile IP, complies with standards under development by the IETF and TIA (Telecommunications Industries Association). In accordance with this service, the NAI is not provided by the mobile node 4 during PPP authentication. Instead, the NAI is delivered as part of a Mobile IP registration request message. Acquisition of the NAI corresponding to a mobile node 4 while employing either Basic or Enhanced Mobile IP is discussed further below in connection with FIGS. 3a and 3b.

After the mobile node 4's NAI has been acquired by the visited data network 2, the IWF 8 provisions the NAI against the mobile node 4's link layer identifier and home IP address in a Mobile Identity table 18. Similarly, the Foreign Agent 10 provisions the NAI against the mobile node 4's Home Agent 12 and home IP address in a Visitor List table 20. Storing the NAI in tables is discussed further below in connection with FIGS. 3a and 3b. As discussed above, a mobile node 4 may have two different NAIs and two (or more) home addresses or one NAI and two (or more) different home addresses. In these cases, the Mobile Identity table 18 may have entries with identical link identifiers, but the combination of the NAI and the mobile node 4's home address is always unique. Similarly, when a mobile node 4 has one NAI and two (or more) different home addresses, the Visitor List table 20 may have entries with identical NAIs, but the combination of the mobile node 4's home address and the Home Agent 12's address is always unique.

When data packets are transmitted over the visited data network 2 in the reverse traffic direction, the IWF 8 retrieves the NAI from the Mobile Identity table 18 and sends it to the Foreign Agent 10. The Foreign Agent 10 uses the NAI and the mobile node 4's home address to find the correct Home Agent address in the Visitor List table 20. Using the NAI when data packets are sent in the reverse traffic direction is further described below in connection with FIG. 4.

When data packets are transmitted over the visited data network 2 in the forward traffic direction, the Foreign Agent 10 retrieves the NAI from the Visitor List 20 table and sends it to the IWF 8. The IWF 8 uses the NAI to find the correct mobile node 4 in the Mobile Identity table 18. Using the NAI when data packets are traveling in the forward traffic direction is further described below in connection with FIG. 5.

Figure 3A:
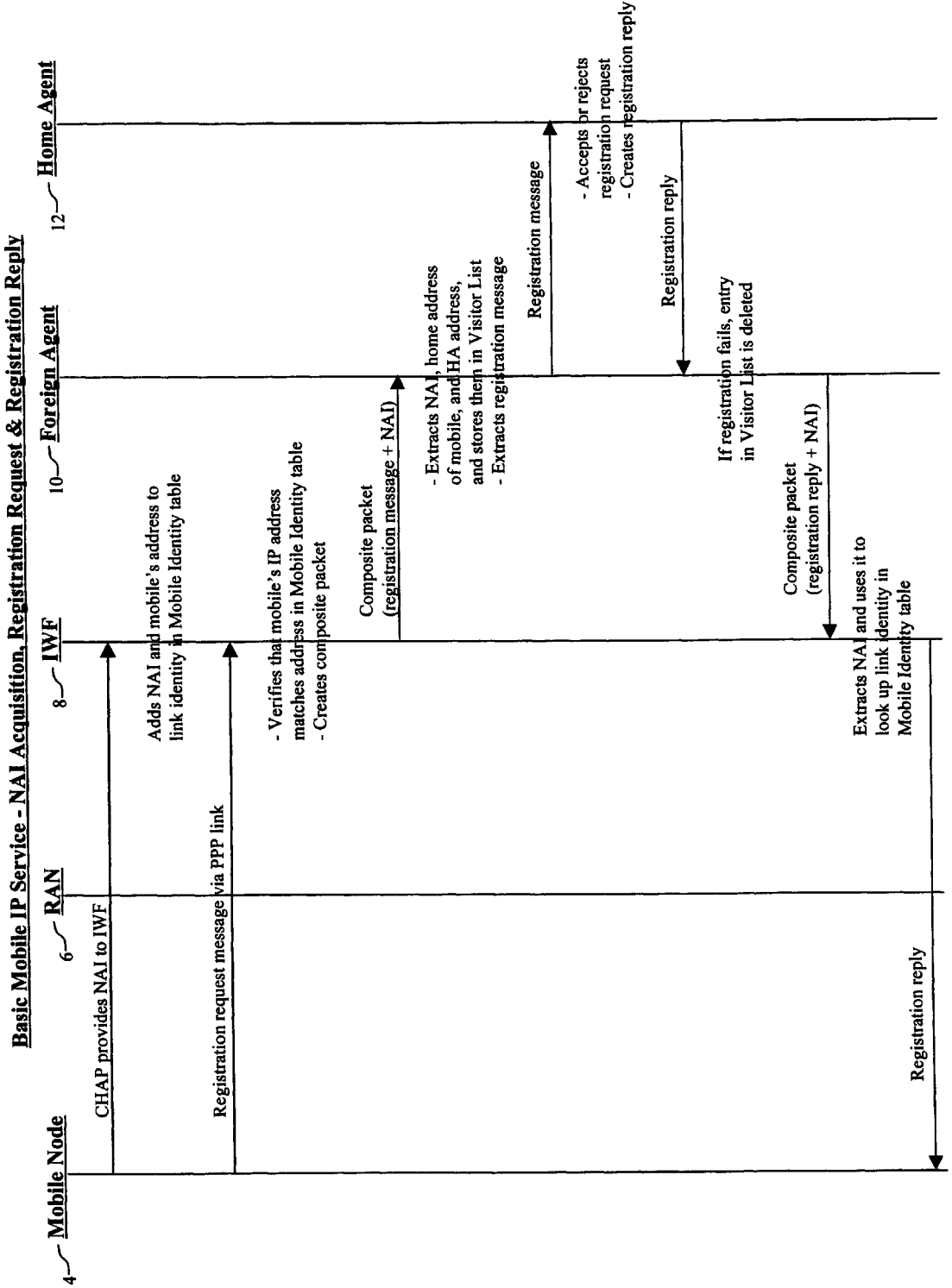
FIG. 3a is a ladder diagram showing method steps performed in accordance with the invention to implement the portion of the wireless data network scheme of FIG. 2 that corresponds to the transmittal of a registration request message and a registration reply between a mobile node and its corresponding Home Agent under Basic Mobile IP service.
Figure 3B:
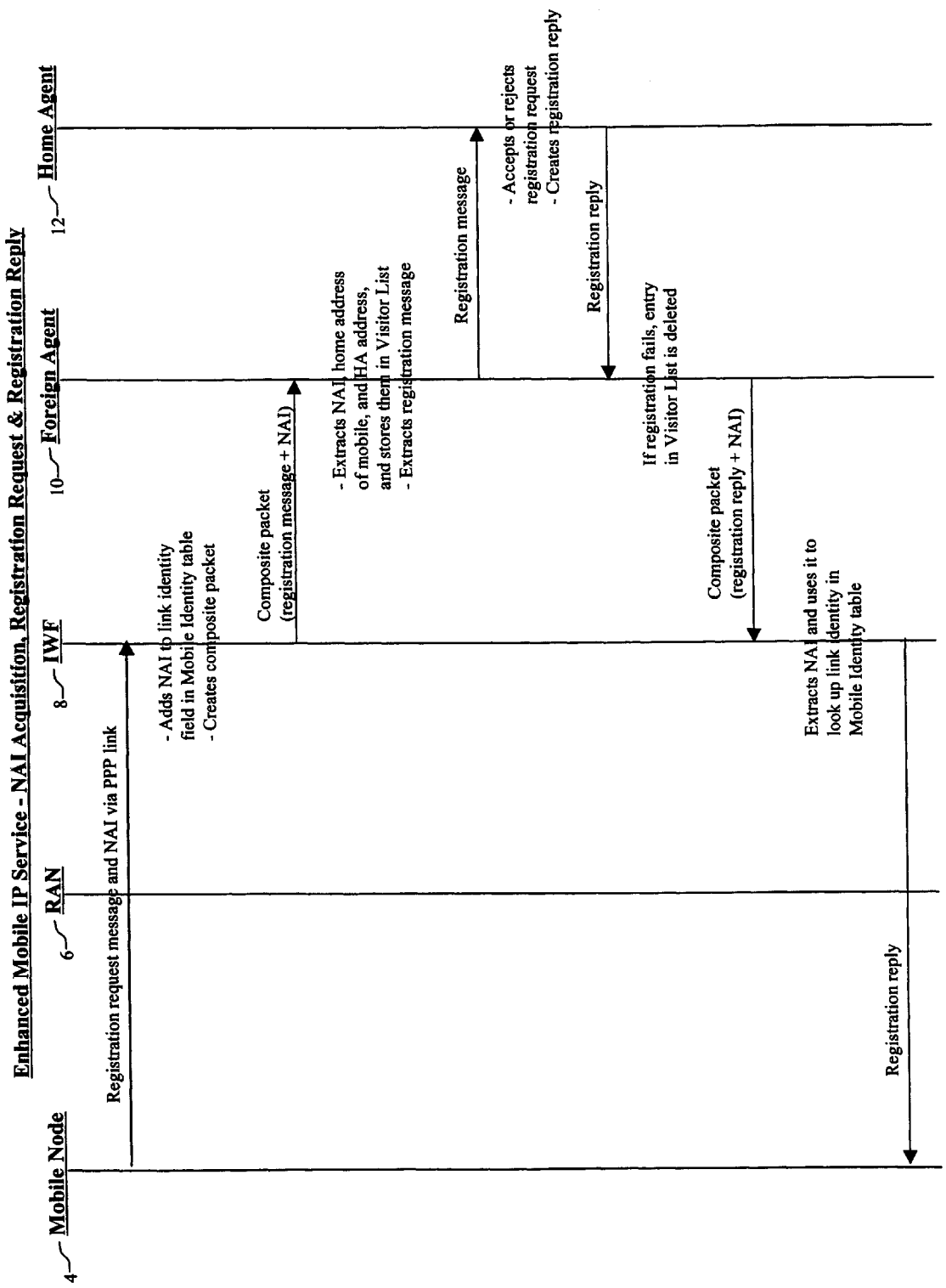
FIG. 3b is a ladder diagram showing method steps performed in accordance with the invention to implement the portion of the wireless data network scheme of FIG. 2 that corresponds to the transmittal of a registration request message and a registration reply between a mobile node and its corresponding Home Agent under Enhanced Mobile IP service.

Turning now to FIGS. 3a and 3b, the steps included in registering a mobile node 4 are shown in two ladder diagrams. PPP link establishment and mobile node 4 registration must precede the transmission of data packets to or from a mobile node 4. Relative to the former, the FIG. 3a ladder diagram shows how the NAI associated with a mobile node 4 is acquired by and stored in the visited data network 2 using the Basic Mobile IP service. Similarly, the FIG. 3b ladder diagram shows the acquisition and storage of the NAI using the Enhanced Mobile IP service. As shown in FIG. 3a, when Basic Mobile IP is employed by the visited data network 2, the IWF 8 acquires the NAI associated with the mobile node 4 during the processing of the Challenge Handshake Authentication Protocol (CHAP), which is known in the art and within the overall PPP procedure. Under Basic Mobile IP, the IWF 8 adds the home address of the mobile node 4 and the NAI to a link identifier field in the Mobile Identity table 18. After PPP is established and the mobile user is authenticated, the mobile-node 4 then sends a Mobile IP registration request message to the IWF 8 over the PPP link. The IWF 8 verifies that the mobile node 4's IP address in the registration request message matches the address in the Mobile Identity table 18 and then routes the registration request and NAI to the Foreign Agent 10.

As shown in FIG. 3b, under the Enhanced Mobile IP service, instead of using CHAP, the registration request message includes the NAI associated with the mobile node 4. The IWF 8 extracts the NAI from the registration message and adds the NAI and the mobile node 4's home address to the link identifier field in the Mobile Identity table 18. If the home IP address in the Mobile IP Registration is zero, implying that the mobile node 4 desires the Home Agent 12 to assign it a home address, the IWF 8 stores a zero as the home address in the Mobile Identity table 18. Later when the Registration Reply from the Home Agent 12 is received by the IWF 8 from the Foreign Agent 10, the IWF 8 uses the NAI to identify the mobile node 4, and replaces the previously-set zero home address that is associated with the NAI of mobile node 4 in the Mobile Identity table 18 with the assigned home address contained in the Mobile IP Registration Reply message. After extracting the NAI and storing the NAI and the mobile node 4's home address (or the value zero), the IWF 8 routes the registration request and NAI to the Foreign Agent 10.

In the steps that follow, which are shown in both FIG. 3a and FIG. 3b, the use of the NAI does not differ between Basic and Enhanced Mobile IP. As stated above, after receiving the registration request message and acquiring the NAI, the IWF 8 sends the NAI and the registration message (i.e., as a composite packet) to the Foreign Agent 10. When the Foreign Agent 10 receives the composite packet, the Foreign Agent 10 extracts the NAI, the home address of the mobile node 4, and the address of the Home Agent 12, and stores them in the Visitor List table 20. If the home address is zero, the Foreign Agent 10 follows the procedures specified in Mobile IP Network Access Identifier Extension—draft-ietf-mobileip-mn-nai-05.txt, which is located on the IETF website at www.ietforg. The Foreign Agent 10 sends the original registration request message, which has been delivered in the composite packet, to the Home Agent 12. The Foreign Agent 10 later receives a registration reply from the Home Agent 12. The reply indicates whether the registration has failed or succeeded. If the registration fails, the entry in the Visitor List table 20 is deleted. Whether indicating success or failure, the registration reply message is always sent back to the IWF 8 in the form of a composite message (the registration reply plus the NAI). The IWF 8 then extracts the NAI and uses it to look up the mobile node 4's link identifier in the Mobile Identity table 18 to determine the destination of the reply. The IWF 8 then sends the registration reply to the identified mobile node 4. After a successful Mobile IP registration, data packets can travel over the communication pathway between the mobile node 4 and the Home Agent 12. Using the NAI to distinguish between mobile nodes when data packets are transmitted in the visited data network 2 is discussed below in connection with FIGS. 4 and 5.

Figure 4:
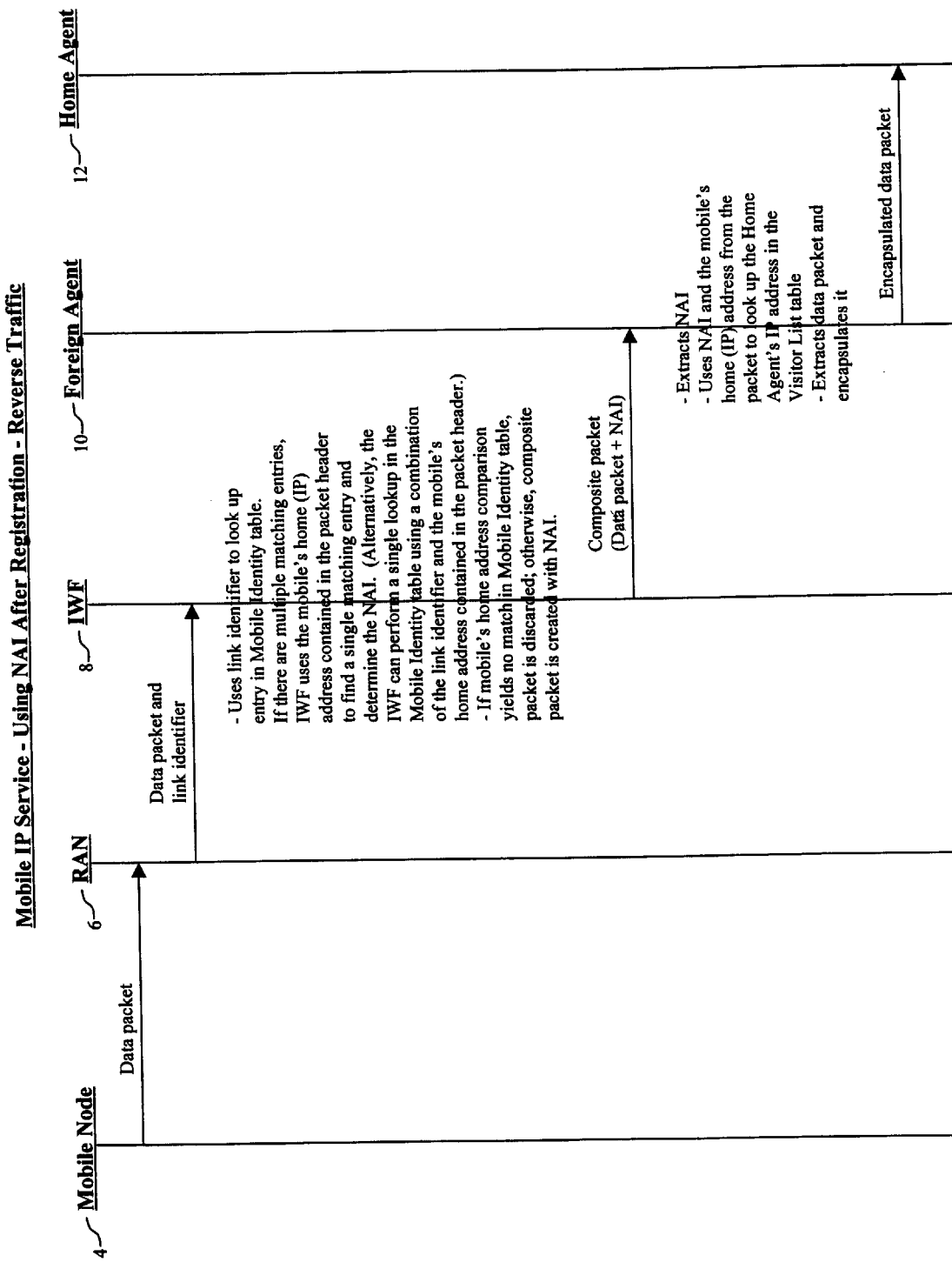
FIG. 4 is a ladder diagram showing method steps performed in accordance with the invention to implement the portion of the wireless data network scheme of FIG. 2 that corresponds to the transmittal of a data packet from a mobile node to its corresponding Home Agent.

Turning now to FIG. 4, the steps for using the NAI while transmitting a data packet in the reverse traffic direction are shown in a ladder diagram. After a successful Mobile IP registration, a data packet originating at the mobile node 4 travels via the RAN 6. From the RAN 6, the data packet arrives at the IWF 8 together with the link identifier. Using this link identifier, the IWP 8 looks for a matching entry in the Mobile Identity table 18. This lookup may yield two or more matching entries because, as discussed above in connection with FIG. 2, two or more entries in the Mobile Identity table 18 may have identical link identifiers. If more than one entry has a matching link identifier, the IWF 8, in a second lookup, compares the home address contained in the packet header to the home addresses in the first lookup's matching entries to find an entry that matches both the link identifier and the home address associated with the data packet. Instead of using the two lookups discussed above, the IWF 8 can also find a matching entry in the Mobile Identity table 18 by performing a single lookup using a combination of the link identifier and the home address contained in the packet header. If the two successive lookups or the single lookup yields a matching entry in the Mobile Identity table 18, the IWF 8 uses the matching entry to determine the NAI of the mobile node 4. If the home address of the mobile node 4 does not match one in the Mobile Identity table 18, the IWF 8 discards the packet. If there is a match, the IWF 8 creates a composite packet that consists of the data packet and the NAI.

After creating the composite packet, the IWF 8 sends the composite packet to the Foreign Agent 10, where the NAI is extracted. Using the extracted NAI and the home address contained in the data packet (either in combination in one table lookup or successively in two table lookups), the Foreign Agent 10 finds the matching entry in the Visitor List table 20. The combination lookup or successive lookups are necessary because, as discussed above in connection with FIG. 2, the Visitor List table 20 may have multiple entries associated with the same NAI. The Visitor List table 20 uses the matching entry to determine the Home Agent address corresponding to the mobile node 4. The Foreign Agent 10 then extracts the data packet and encapsulates it for transfer to the Home Agent 12 that has the address determined in the previous step.

Turning now to FIG. 5, the steps for using the NAI while transmitting a data packet in the forward traffic direction are shown in a ladder diagram. A data packet traveling in the forward traffic direction starts at the Home Agent 12, where it is encapsulated and tunneled to the Foreign Agent 10. Using the IP addresses of the mobile node 4 and the Home Agent 12, the Foreign Agent 10 finds the NAI corresponding to the mobile node 4 in the Visitor List table 20. After finding the NAI, the Foreign Agent 10 creates a composite packet using the NAI and the data packet received from the Home Agent 12. The Foreign Agent 10 sends the composite packet to the IWF 8. The IWF 8 extracts the NAI from the composite packet and uses its Mobile Identity table 18 to find the link identifier corresponding to the mobile node 4 identified by the NAI. Using this link identifier, the IWF 8 sends the data packet via the RAN 6 to the correct mobile node 4.

Accordingly, a system and method have been described for using a mobile node identifier shared between the IWF and the Foreign Agent to correctly route data packets in a visited data network where mobile nodes are connected to the visited data network and have overlapping IP addresses. Although the mobile node identifier in the above-illustrated embodiment is an NAI, it will be appreciated in light of the teachings herein that the mobile node identifier could also be implemented using other unique identifiers. In addition to the methodologies described above, it should be apparent that other variations and alternative embodiments could be implemented using any other identifier that can uniquely identify a mobile node. It will also be appreciated in light of the teachings herein that the visited data network in which the data packets are transmitted is not limited to a wireless IP (digital cellular) data network. The visited data network could also be a non-wireless network, such as a standard Ethernet LAN, or a fixed wireless network, such as a WaveLAN® based network, where data from a mobile node to the network is communicated via short-range infrared waves. It is understood, therefore, that the invention is not to be in any way limited except in accordance with the spirit of the appended claims and their equivalents.

What is claimed is:

1. In a visited data network wherein data packets are routed to and from two or more mobile nodes that have overlapping home (IP) addresses and are connected to the visited data network, a method for distinguishing between said mobile nodes, comprising the steps of:

acquiring a mobile node identifier from each of said mobile nodes in said visited data network, wherein each mobile node identifier uniquely identifies one of said mobile nodes; and sharing said mobile node identifier between an Interworking Function network element communicating with said mobile nodes across an air interface and a routing entity (Foreign Agent) providing network access to said mobile nodes.

2. A method in accordance with claim 1 wherein said visited data network is a digital cellular network with IP connectivity to the Internet.

3. A method in accordance with claim 1 wherein said mobile node identifier is a Network Address Identifier (NAI).

4. A method in accordance with claim 1 wherein said acquiring step includes providing said mobile node identifier to said visited data network by establishing a Point to Point Protocol (PPP) and performing a Challenge Handshake Authentication Protocol (CHAP) while using Basic Mobile IP service.

5. A method in accordance with claim 1 wherein said acquiring step includes providing said mobile node identifier to said visited data network by registering said mobile node on said visited data network while using Enhanced Mobile IP service.

6. A method in accordance with claim I wherein said sharing step includes storing said mobile node identifier, along with a home (IP) address and a link identifier that correspond to a mobile node identified by said mobile node identifier, in a Mobile Identity table associated with said Interworking Function, wherein each entry in said Mobile Identity table contains a unique combination of said mobile node identifier and said home address of said mobile node.

7. A method in accordance with claim 6 further including determining said mobile node identifier associated with a mobile node from which a data packet is transmitted by either:
  performing a lookup in said Mobile Identity table using a link identifier from said mobile node and, if more than one entry in said Mobile Identity table has a matching link identifier, performing a second lookup from among said matching entries using a home address contained in said data packet's header; or
  performing a lookup in said Mobile Identity table using a combination of a link identifier from said mobile node and a home address contained in said data packet's header.

8. A method in accordance with claim 1 wherein said sharing step includes storing said mobile node identifier, along with a mobile node home (IP) address and a Home Agent IP address associated with a mobile node identified by said mobile node identifier, in a Visitor List table associated with said Foreign Agent, wherein each entry in said Visitor List table contains a unique combination of said mobile node home address and said Home Agent IP address.

9. A method in accordance with claim 8 further including determining said Home Agent IP address associated with said mobile node from which a data packet is transmitted by either:
  performing a lookup in said Visitor List table using a mobile node identifier attached to said data packet and, if more than one entry in said table has a matching mobile node identifier, performing a second lookup from among said matching entries using a home address contained in said data packet; or
  performing a lookup in said Visitor List table using a combination of a mobile node identifier attached to said data packet and a home address contained in said data packet.

10. A method for identifying two different mobile nodes that are connected to the same visited data network and have overlapping home (IP) addresses, comprising the steps of:
  providing to said visited data network, for each mobile node, a mobile node address identifier (Network Address Identifier or NAI) that uniquely identifies one of said mobile nodes across said visited data network;
  storing said NAIs in a Mobile Identity lookup table associated with an Interworking Function communicating with said mobile nodes and in a Visitor List lookup table associated with a Foreign Agent routing entity providing network access to said mobile nodes;
  creating composite data packets each of which includes one of said NAIs bound to a data packet whose origin or destination is one of said mobile nodes which corresponds to said bound NAI;
  exchanging said composite packets between said Interworking Function and said Foreign Agent for both forward Mobile IP traffic and reverse Mobile IP traffic;
  extracting said NAIs from said composite packets at said Foreign Agent for said composite packets moving in the reverse Mobile IP traffic direction, and at said Interworking Function for said composite packets moving in the forward Mobile IP traffic direction; and
  using one of said extracted NAIs to identify a unique route to either a Home Agent corresponding to the mobile node associated with said NAI for reverse Mobile IP traffic or the mobile node associated with said NAI for forward Mobile IP traffic.

11. A method in accordance with claim 10 wherein said visited data network is a digital cellular network with IP connectivity to the Internet.

12. A method in accordance with claim 10 wherein said providing step includes performing a CHAP protocol during PPP establishment to provide said visited data network with said NAI within Basic Mobile IP service.

13. A method in accordance with claim 10 wherein said providing step includes delivering said NAI to said visited data network as part of a mobile node registration request message transmitted within Enhanced Mobile IP service.

14. A method in accordance with claim 10 wherein said storing step includes:
  storing each of said NAIs, along with a home (IP) address and a link identifier that correspond to a mobile node identified by said NAI, in an entry of said Mobile Identity table, wherein each entry contains a unique combination of said NAI and said IP address; and
  storing each of said NAIs, along with a mobile node home address and a Home Agent IP address associated with a mobile node identified by said NAI, in an entry of said Visitor List table, wherein each entry contains a unique combination of said mobile node home address and said Home Agent IP address.

15. A method in accordance with claim 10 wherein said using step includes either using a combination of said mobile node's home address and said NAI, along with said Visitor List table, to identify said unique route to said Home Agent (for reverse Mobile IP traffic), or using said NAI, together with said Mobile Identity table, to identify said unique route to said mobile node (for forward Mobile IP traffic).

16. In a visited data network wherein data packets are routed to and from two or more mobile nodes that have overlapping home (IP) addresses and are connected to the visited data network, a system for distinguishing between said mobile nodes, comprising:
  a mobile node identifier corresponding to each of said mobile nodes in said visited data network, wherein each mobile node identifier is provided by and uniquely identifies one of said mobile nodes; and
  means for sharing said mobile node identifier between an Interworking Function network element communicating with said mobile nodes across an air interface and a routing entity (Foreign Agent) providing network access to said mobile nodes.

17. A system in accordance with claim 16 wherein said visited data network is a digital cellular network with IP connectivity to the Internet.

18. A system in accordance with claim 16 wherein said mobile node identifier is a Network Address Identifier (NAI).

19. A system in accordance with claim 16 further including means for acquiring said mobile node identifier by establishing PPP and performing the CHAP protocol while using Basic Mobile IP service.

20. A system in accordance with claim 16 further including means for acquiring said mobile node identifier by registering said mobile node on said visited data network while using Enhanced Mobile IP service.

21. A system in accordance with claim 16 wherein said means for sharing said mobile node identifier includes means for storing said mobile node identifier, along with a home (IP) address and a link identifier that correspond to a mobile node identified by said mobile node identifier, in a Mobile Identity table associated with said Interworking Function, wherein each entry in said Mobile Identity table contains a unique combination of said mobile node identifier and said home address of said mobile node.

22. A system in accordance with claim 21 further including means for determining said mobile node identifier associated with a mobile node from which a data packet is transmitted by either:

performing a lookup in said Mobile Identity table using a link identifier from said mobile node and, if more than one entry in said Mobile Identity table has a matching link identifier, performing a second lookup from among said matching entries using a home address contained in said data packet's header; or performing a lookup in said Mobile Identity table using a combination of a link identifier from said mobile node and a home address contained in said data packet's header.

23. A system in accordance with claim 16 wherein said means for sharing said mobile node identifier includes means for storing said mobile node identifier, along with a mobile node home (IP) address and a Home Agent IP address associated with a mobile node identified by said mobile node identifier, in a Visitor List table associated with said Foreign Agent, wherein each entry in said Visitor List table contains a unique combination of said mobile node home address and said Home Agent IP address.

24. A system in accordance with claim 23 further including means for determining said Home Agent IP address associated with said mobile node from which a data packet is transmitted by either:

performing a lookup in said Visitor List table using a mobile node identifier attached to said data packet and, if more than one entry in said Visitor List table has a matching mobile node identifier, performing a second lookup from among said matching entries using a home address contained in said data packet; or performing a lookup in said Visitor List table using a combination of a mobile node identifier attached to said data packet and a home address contained in said data packet.

25. A system for identifying two different mobile nodes that are connected to the same visited data network and have overlapping home (IP) addresses, comprising:

a mobile node address identifier (Network Address Identifier or NAI) that is provided for each of said mobile nodes and that uniquely identifies one of said mobile nodes across said visited data network;

means for storing said NAIs in a Mobile Identity lookup table associated with an Interworking Function communicating with said mobile nodes and in a Visitor List lookup table associated with a Foreign Agent routing entity providing network access to said mobile nodes;

composite data packets, each of which includes one of said NAIs bound to a data packet whose origin or destination is one of said mobile nodes which corresponds to said bound NAI;

means for exchanging said composite packets between said Interworking Function and said Foreign Agent for both forward Mobile IP traffic and reverse Mobile IP traffic;

means for extracting said NAIs from said composite packets at said Foreign Agent for said composite packets moving in the reverse Mobile IP traffic direction, and at said Interworking Function for said composite packets moving in the forward Mobile IP traffic direction; and means for using one of said extracted NAIs to identify a unique route to either a Home Agent corresponding to the mobile node associated with said NAI for reverse Mobile IP traffic or the mobile node associated with said NAI for forward Mobile IP traffic.

26. A system in accordance with claim 25 wherein said visited data network is a digital cellular network with IP connectivity to the Internet.

27. A system in accordance with claim 25 further including means for providing said NAI to said visited data network by performing a CHAP protocol during PPP establishment within Basic Mobile IP service.

28. A system in accordance with claim 25 further including means for providing said NAI to said visited data network as part of a mobile node registration request message transmitted within Enhanced Mobile IP service.

29. A system in accordance with claim 25 wherein said means for storing further includes:

means for storing each of said NAIs, along with a home (IP) address and a link identifier that correspond to a mobile node identified by said NAI, in an entry of said Mobile Identity table, wherein each entry contains a unique combination of said NAI and said IP address; and means for storing each of said NAIs, along with a mobile node home address and a Home Agent IP address associated with a mobile node identified by said NAI, in an entry of said Visitor List table, wherein each entry contains a unique combination of said mobile node home address and said Home Agent IP address.

30. A system in accordance with claim 25 wherein said means for using extracted NAIs includes means for either using a combination of said mobile node's home address and said NAI, along with said Visitor List table, to identify said unique route to said Home Agent (for reverse Mobile IP traffic), or using said NAI, together with said Mobile Identity table, to identify said unique route to said mobile node (for forward Mobile IP traffic).

31. In a visited wireless data network wherein data packets are sent in both directions over a communications pathway that includes, in succession, a visiting mobile wireless node, a Radio Access Network (RAN), an Interworking Function (IWF), and a Foreign Agent routing entity, routing said data packets between said visiting mobile wireless node and a Home Agent routing entity in said visiting mobile wireless node's home data network, a method for correctly routing said data packets by distinguishing between said visiting mobile node and another mobile node in said visited wireless data network having the same home address as said visiting mobile wireless node, comprising the steps of:

acquiring, for each mobile node registered on said visited wireless data network, a mobile node identifier (Network Address Identifier or NAI) uniquely identifying one of said registered mobile nodes by performing a CHAP protocol during PPP establishment under Basic Mobile IP or by sending a registration message under Enhanced Mobile IP;

storing said NAI, along with a home (IP) address and a link identifier that correspond to a mobile node identified by said NAI in a Mobile Identity table associated with said IWF during the CHAP or registration phase of Mobile IP service, wherein each entry in said Mobile Identity table contains a unique combination of said NAI and said home address of said mobile node;

storing said NAI, along with a home (IP) address and a Home Agent IP address that correspond to a mobile node identified by said NAI, in a Visitor List table associated with said Foreign Agent during the registration phase of Mobile IP service, wherein each entry in said Visitor List table contains a unique combination of said mobile node home address and said Home Agent IP address;

retrieving, when reverse Mobile IP traffic arrives at said IWF, one of said stored NAIs by using a link identifier from said mobile node and a home address contained in said data packet's header, either in combination in a single lookup or successively in two lookups in said Mobile Identity table;

retrieving, when forward Mobile IP traffic arrives at said Foreign Agent, one of said stored NAIs by using home addresses of said mobile node and said Home Agent, either in combination in a single lookup or successively in two lookups in said Visitor List table;

appending said retrieved NAI to data packets exchanged between said IWF and said Foreign Agent, thereby creating composite packets;

extracting said NAI from said composite packets upon receipt thereof at said IWF and said Foreign Agent;

determining said Home Agent's IP address when reverse Mobile IP traffic arrives at said Foreign Agent by using said extracted NAI and said mobile node's home address either in combination in a single lookup or successively in two lookups in said Visitor List table;

determining said mobile node's link identifier when forward Mobile IP traffic arrives at said IWF by using said extracted NAI in a lookup in said Mobile Identity table; and routing each of said data packets to a correct destination at said Home Agent by using said Home Agent IP address or at said mobile node by using said mobile node's link identifier.

* * * * *